United States Patent [19]
Zeilstra et al.

[11] Patent Number: 4,687,835
[45] Date of Patent: Aug. 18, 1987

[54] COPOLYETHERESTER BASED ON POLY (PROPYLENE OXIDE) GLYCOL BLOCKED WITH ETHYLENE OXIDE

[75] Inventors: Jacobus J. Zeilstra, Doetinchem; Ted Brink, Arnhem, both of Netherlands

[73] Assignee: Akzo nv, Arnhem, Netherlands

[21] Appl. No.: 863,787

[22] Filed: May 16, 1986

[30] Foreign Application Priority Data

May 17, 1985 [NL] Netherlands ............... 8501422

[51] Int. Cl.$^4$ ............................................. C08G 63/66
[52] U.S. Cl. ....................................... 528/300; 528/301
[58] Field of Search ................................. 528/300, 301

[56] References Cited

U.S. PATENT DOCUMENTS

| 3,652,713 | 3/1972 | Okazaki et al. | 524/140 |
| 4,013,624 | 3/1977 | Hoeschele | 528/300 |
| 4,205,158 | 5/1980 | Hoeschele | 528/300 |
| 4,251,652 | 2/1981 | Tanaka et al. | 528/279 |
| 4,262,114 | 4/1981 | Wagener et al. | 528/301 |
| 4,321,341 | 3/1982 | Neuberg et al. | 525/437 |

FOREIGN PATENT DOCUMENTS 0203634 12/1986 European Pat. Off. .

OTHER PUBLICATIONS

Research Disclosure, No. 186, pp. 554, Abstract No. 18610, "Improvements in and Relating to Tennis Balls".

Primary Examiner—Lucille M. Phynes
Attorney, Agent, or Firm—Stevens, Davis, Miller & Mosher

[57] ABSTRACT

A copolyetherester comprising a random head-to-tail copolymer of 25–55 percent by weight of short-chain ester units; at least 75 mole percent is composed of 1,4-butylene terephthalate units, and long-chain ester units derived from ethylene oxide-capped poly(propylene oxide) glycol having an ethylene oxide content of from 15–35 percent by weight and a number average molecular weight ranging from 1500–2800. The copolyetherester displays improved physical properties, such as a higher elongation at rupture, notched tensile impact energy and tearing energy, if its relative viscosity (1 g of polymer in 100 g m-cresol at 25° C.) is in the range of 2,45 to 5,0 and the melt index MFI is between $$0,2 + 157 \times e^{-(\frac{\eta_{rel}-0,14}{0,8469})^2}$$

and $$3,2 + 157 \times e^{-(\frac{\eta_{rel}-1,74}{0,8469})^2}$$

It may be prepared by melt condensation of a copolyetherester having a relative viscosity of 1,8 to 2,5 and subsequently subjecting it to post-condensation in the solid phase for a sufficient period to obtain a polymer corresponding to said viscosity and melt index.

8 Claims, No Drawings

COPOLYETHERESTER BASED ON POLY (PROPYLENE OXIDE) GLYCOL BLOCKED WITH ETHYLENE OXIDE

The invention relates to a copolyetherester substantially consisting of repeating intralinear long-chain ester units and short-chain ester units which are randomly joined head-to-tail through ester linkages, which long-chain ester units correspond to the formula

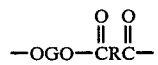

and which short-chain ester units correspond to the formula

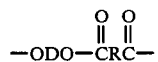

wherein G represents a divalent radical which remains after removal of terminal hydroxyl groups from a poly(-propylene oxide) glycol of which the terminal groups are capped with 15 to 35% by weight of ethylene oxide and which has a molecular weight of 1500 to 2800, and R represents a divalent radical which remains after removal of carboxyl groups from at least one carboxylic acid having a molecular weight of less than 300, and D represents a divalent radical which remains after removal of hydroxyl groups from at least one aliphatic diol having a molecular weight of less than 250, with the proviso that the short-chain ester units comprise at least 75 mole per cent of 1,4-butylene terephthalate units, the short-chain ester units form 25 to 55% by weight of the copolyetherester and the melt index MFI (determined at 230° C. in conformity with ASTM D-1238) is not higher than 50. The invention also relates to a process for the preparation of such a copoly-etherester.

Copolyetheresters of the above composition but containing 15 to 95% by weight, preferably 25 to 80% by weight of short-chain ester units are known from Research Disclosure No. 186, October 1979, No. 18610.

According to U.S. Pat. No. 4,205,158 the preparation of the above type of copolyetheresters containing 25 to 48% by weight of short-chain ester units should be carried out in the presence of at least 1.5 equivalents of branching agent per 100 moles of dicarboxylic acid in order to obtain a sufficiently high degree of polymerization without excessive polymer degradation during the melt condensation polymerization. The use is therefore proposed therein of 1.6 to 6 equivalents of branching agent mentioned in the examples corresponds to 2.1 equivalents per 100 moles of dicarboxylic acid, preference being given to an amount corresponding to 2.5–5.5 equivalents per 100 moles of dicarboxylic acid.

In example 3 of said U.S. Patent Specification it further says that if no use is made of a branching agent in the preparation of a copolyesthereser of the composition given in it, the minimum melt index (measured at 230° C.) achievable after very long polycondensation cycles is 73 g/10 minutes. Of such a polymer the physical properties such as tensile strength and tear resistance appear to be quite insufficient as compared with those of the well-known copolyetheresters of similar hardness and based on polyetetramethylene oxide glycol.

Although according to the examples of the aforementioned U.S. Patent specification these properties can be improved by including in the copolyetheresters a relatively large amount of branching agent, it appears that when use is made of a large amount of branching agent several of these physical properties, such as elongation at rupture, tensile impact energy (notched) and tearing energy need to be further improved.

The present invention provides a copolyetherester which is of the afore-mentioned composition and displays greatly improved physical properties.

The invention consists in that the relative viscosity $\eta_{rel}$ (1 g of polymer in 100 g of m-cresol at 25° C.) of a copolyetherester of the composition as mentioned in the opening paragraph is in the range of from 2.45 to 5.0 and the melt index MFI is between $$0.2 + 157 \times e^{-(\frac{\eta_{rel}-0.14}{0.8469})^2}$$

and $$3.2 + 157 \times e^{-(\frac{\eta_{rel}-1.74}{0.8469})^2}$$

Surprisingly, it has been found that copolyetheresters of the well-known composition mentioned in the opening paragraph, which however contain no or less than 1.5 equivalents of a branching agent per 100 moles of dicarboxylic acid, and of which the relative viscosity and the melt index are between the above-mentioned limits, display a higher elongation at rupture, notched tensile impact energy and tearing energy than copolyetheresters of similar composition and hardness that are prepared by the process of the afore-mentioned U.S. Patent Specification. Moreover, the flexural modulus of these copolyetheresters is significantly lower than that of copolyetheresters of a similar composition, in which however in particular such an amount of branching agent is contained as corresponds to that mentioned in the examples of the U.S. Patent Specification.

According to the invention special preference is given to copolyetheresters of which the short-chain ester units constitute 35 to 50% by weight of the copolyetherester.

It has been found that copolyetheresters which have a melt indix not higher than 30 g/10 min at a relative viscosity >2.6 have excellent physical properties. Especially preferred are copolyetheresters that gave a melt index not higher than 20 g/10 min at a relative viscosity >2.75. Several of these copolyetheresters can be processed not only by extrusion, but also by blow moulding and film moulding.

At least 75 mole % of the low molecular weight diol and at least 75 mole % of the low molecular weight dicarboxylic acid of which the ester units of the formula

are derived, are formed by 1,4-butanediol and terephthalic acid, respectively. Preferred are copolyetheresters of which the short-chain ester units substantially consist of 1,4-butylene terephthalate units. For special uses replacement of a small percentage of the 1,4-butanediol with another diol and/or replacement of terephthalic acid with another low molecular weight dicarboxylic acid may be of advantage. Included among low molecular weight diols (other than 1,4-butanediol) which are converted into short-chain ester units are acyclic, alicyclic and aromatic dihydroxy compounds. Preferred are diols with 2-15 carbon atoms such as ethylene, propylene, 2-butenylene, pentamethylene, 2,2-dimethyltrimethylene, hexamethylene, and decamethylene glycol, dihydroxy cyclohexane, dimethanol cyclohexane, resorcinol, hydroquinone and 1,5-dihydroxy naphthalene. Especially preferred are aliphatic diols containing 2-8 carbon atoms.

Included among the bis-phenols which can be used are bis(p-hydroxy)diphenyl, bis(p-hydroxyphenyl)methane and bis(p-hydroxyphenyl)propane.

Corresponding ester forming derivatives of diols are also suitable for use (for instance ethylene oxide or ethylene carbonate may be used instead of ethylene glycol). The term "low molecular weight diols" as used in the description of the invention also refers to these corresponding ester forming derivatives, the molecular weight requirement relating to the diols as such and not to derivatives thereof.

Suitable dicarboxylic acids (other than terephthalic acid) which are reacted with the afore-mentioned long-chain glycols and with low molecular weight diols to form copolyesters are aliphatic, cyclosliphatic or aromatic dicarboxylic acids having a molecular weight not higher than 300. The term dicarboxylic acid used in the description of the invention also refers to equivalents of dicarboxylic acids having two functional carboxyl groups whose behaviour is practically the same as that of the dicarboxylic acids in the conversion with glycols and diols to copolyetheresters.

These equlvalents include esters and ester forming derivatives, such as the acid halides and anhydrides. The requirements regarding the molecular weight relate to the acid and not to equivalent esters or ester forming derivatives thereof. The dicarboxylic acids may contain randomly substituted groups or combinations which do not detrimentally affect copolyester formation or the use of the polymer in the elastomeric compositions according to the invention. Aliphatic dicarboxylic acids, as the term is used herein, are carboxylic acids having two carboxyl groups which are each attached to a saturated carbon atom. Aliphatic or cyloaliphatic acids having conjugated unsaturation often cannot be used because of homopolymerization. However, some unsaturated acids, such as maleic acid, can be used. Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Preference is given to cyclohexane dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl)methane, p-oxy(p-carboxyphenyl) benzoic acid, ethylenebis(p-oxybenzoic acid) 1,5-naphthalene dicarboxylic acid, 2,6-naphthalene dicarboxylic acid, 2,7-naphthalene dicarboxylic acid, phenanthrene dicarboxylic acid, anthracene dicarboxylic acid,4,4'-sulfonyl bibenzoic acid and C$_1$-C$_{12}$ alkyl and ring substitution derivatives thereof, such as halo, alkoxy, and aryl derivatives. Hydroxyl acids such as p($\beta$-hydroxy-ethoxy) benzoic acid can also be used providing an aromatic dicarboxylic acid is also present.

Aromatic dicarboxylic acids are preferred class for preparing the copolyester polymers of this invention. Among the aromatic acids, those with 8-16 carbon atoms are preferred, particularly the phenylene dicarboxylic acids, i.e., phthalic and isophthalic acids.

The long-chain glycols can be prepared by condensation of propylene oxide with propylene glycol or water in the presence of a basic catalyst to form a polypropylene oxide glycol, which is then reacted with ethylene oxide to obtain the copolymer.

The ethylene oxide content in the ethylene oxide capped poly(propylene oxide)glycol must be in the range of 15 to 35 percent by weight. A higher percentage may give rise to a polymer which exhibits excessive water swell while at a lower percentage phase separation occurs during the melt condensation polymerization. Moreover, the number average molecular weight must be in the range of 1500 to 2800. A lower molecular weight leads to unsatis- factory physical properties particularly with copolyetheresters having less than 48% by weight of short-chain ester units. Use of a higher molecular weight may give rise to phase separation.

The invention also relates to a process for the preparation of the copolyetheresters mentioned in the opening paragraph which have a relative viscosity of 2.45 to 5.0 and a melt index MFI (determined at 230° C. in conformity with ASTM-D-1238) between $$0{,}2 + 157 \times e^{-(\frac{\eta_{rel}-0{,}14}{0{,}8469})^2}$$

and $$3{,}2 + 157 \times e^{-(\frac{\eta_{rel}-1{,}74}{0{,}8469})^2}$$

It consists in that in a process of the afore-mentioned U.S. Pat. No. 4,205,158 first a copolyetherester of a relative viscosity of 1.8 to 2.5 is prepared by melt condensation, which is followed by post condensation in the solid phase in a stream of an inert gas or in vacuo at a temperature of 170° to 220° C. until a relative viscosity of 2.45 to 5.0 is obtained and a melt index MFI between $$0{,}2 + 157 \times e^{-(\frac{\eta_{rel}-0{,}14}{0{,}8469})^2}$$

and $$3{,}2 + 157 \times e^{-(\frac{\eta_{rel}-1{,}74}{0{,}8469})^2}$$

It should be added that a postcondensation in the solid phase is known in itself from U.S. Pat. No. 3,801,547.

According to the process described therein the copolyester should be subjected to melt condensation to obtain an inherent viscosity of at least 0.8 dl/g as measured in m-cresol at 30° C. before subjecting it, in the form of solid particles measuring at least 0.8 to 4.0 mm, to solid phase postcondensation. Whereas according to the examples the polycondensation reaction of copolyetheresters based on, say, polytetramethylene oxide glycol is stopped at a relatively early stage followed by postcondensation in the solid phase, the melt condensation of copolyetheresters based on 1,2-poly(propylene oxide) glycol is not stopped until a maximum attainable viscosity is obtained. When use is made of this process for the preparation in the absence of a branching agent of a copolyetherester of the composition described in Example 3 of the afore-mentioned U.S. Pat. No. 4,205,158, but having a melt index of, say, 5 g/10 min, it appears that solid phase postcondensation of a polymer having a melt index of 73 g/10 min on an industrial scale, although not impossible, is yet impracticable on economical grounds.

It must therefore be considered extraordinarily surprising that the process of the present invention permits obtaining copolyetheresters of the composition mentioned in the opening paragraph without detracting from the physical properties such as tensile strength or tear resistance.

In the melt condensation of the copolyetheresters according to the present invention use may be made of a conventional ester interchange reaction.

A preferred procedure involves heating the dimethyl ester of terephthalic acid with a long chain glycol and a molar excess of butanediol in the presence of a catalyst at 150° to 260° C., followed by distilling off methanol formed by the interchange. Heating is continued until methanol evolution is complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below. Such prepolymers can also be prepared by a number of other esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously, the prepolymer might also be prepared by running these processes in the presence of the long-chain glycol.

The resulting prepolymer is then carried to high molecular weight by distillation of the excess of short chain diol. This process is known as "polycondensation". Additional ester interchange occurs during this distillation to increase the molecular weight and to randomize the arrangement of the copolyesters units. Best results are usually obtained if this final distillation or polycondensation is run at a pressure not higher than 130 Pa and 240°–260° C. for not more than 6 and preferably not more than 4 hours in the presence of antioxidants such as sym- di- beta-naphthyl-p-phenylenediamine and 1,3,5-trimethyl-2,4,6-tri[3,5-ditertiarybutyl-4-hydroxybenzyl]benzene.

Most practical polymerization techniques rely upon ester interchange to complete the polymerization reaction. In order to avoid excessive hold time at high temperatures with possible irreversible thermal degradation, it is advantageous to employ a catalyst for ester interchange reactions. Although a wide variety of catalysts can be used, organic titanates such as tetrabutyl titanate used alone or in combination with magnesium or calcium acetate are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

After completion of the polycondensation reaction the mixture is processed into granules and then subjected to postpolymerization in the solid phase at 140°–220° C. in vacuum or in a stream of an inert gas.

The particles required for the solid phase postcondensation can be formed by any conventional technique. The partially condensed material from the melt can be cooled by casting on a cold wheel and shredding the resulting sheet. A preferred technique involves forming a strand of the melt, quenching it with cold water and cutting the strand into pellets of 1.5–4 mm in diameter. The particles are subjected to a temperature of 140° to 220° C., preferably about 20° C. below the polymer stick temperature for a period of 4 to 48 hours.

The solid phase polycondensation must take place in an inert gas stream or in a vacuum. Preferred inert gas stream are nitrogen, carbon dioxide and carbon monoxide. When an inert gas stream is used, the pressure may range from reduced pressure as low as 0.1 KPa up to superatmospheric pressure, but operation under reduced pressure is preferred. If vacuum is to be utilized alone, a pressure of less than 0.7 KPa must be maintained. The use of an inert gas stream or vacuum is essential to remove polymerization by-products.

The solid phase polycondensation can be carried out in batch and continuous equipment.

The postcondensation reaction is continued until the mixture has a melt index of less than 50 g/10 min determined at 230° C. in accordance with ASTM D-1238. The course of the reaction may be followed by removing samples periodically and determining their relative viscosity.

Within the scope of the present invention copolyetheresters having particularly favourable physical properties are obtained when by melt condensation a copolyetherester is prepared having a relative viscosity in the range of 1.85 to 2.35, after which it is subjected to postcondensation in the solid phase to obtain a melt index not higher than 30 g/10 min and a relative viscosity of at least 2.6. Copolyetheresters having optimum properties are obtained when a copolyetherester is prepared having a relative viscosity in the range of 1.9 to 2.3, after which it is subjected to postcondensation in the solid phase to obtain a melt index not higher than 20 g/10 min and a relative viscosity of at least 2.75.

The following examples are intended to illustrate the invention but are not to be construed as limiting in any manner the scope thereof.

For the determination of the properties of the polymers prepared in accordance with the examples use was made of the following test methods. The measurements were conducted on samples cut out of sheets of 110×110×2 mm in a direction parallel ( $\parallel$ ) and perpendicular ($\perp$) to the direction of injection moulding.

The relative viscosity $\eta_{rel}$ was determined in a solution of 1% by weight in m-cresol at 25° C.;

the melt index MFI in g/10 min was determined at 230° C. and a load of 2.16 kg in accordance with ASTM D 1238;

the hardness, in Shore D, was measured in conformity with ASTM D 2240;

the flexural modulus, in MPa, was measured in conformity with ISO 178;

the tensile strength, in MPa, was measured in accordance with ISO 427 at a tensile rate of 500 mm/min;

the elongation at rupture, in % $E_B$, was measured in accordance with ISO 527;

the notched tensile impact energy, in J, was measured in accordance with DIN 53448;

the resistance to tear propagation in kN/m, and the tear propagation energy in J were measured in accordance with ASTM D 1938, but at a tensile rate of 500 mm/min;

the tear resistance in kN/m, and the tearing energy in J according to Graves, with incision, were determined in conformity with DIN 53515 at a tensile rate of 500 mm/min;

the tear resistance in kN/m, and the tearing energy accoring to Graves, without incision, were measured in conformity with ASTM D 624 at a tensile rate of 500 mm/min.

EXAMPLE I

Into a 200-l reactor there were introduced 19.3 kg of dimethyl tereperephthalate and 13.4 kg of 1,4-butanediol. The reaction mixture was heated to 160° C., with stirring, after which 9.6 kg of tetrabutyl titanate were added. Upon a further increase in temperature to 170° C. methanol distilled off. Subsequently, the pressure was reduced to 26.7 kPa over a period of 20 minutes. This pressure was maintained until the melt temperature of the reaction mixture was 210° C. Under atmospheric conditions there were added to the reaction mixture 25.7 kg of poly-1,2-propylene oxide glycol capped with ethylene oxide groups (number average molecular weight 2370, ethylene oxide content 20% by weight) and 500 g of the phenolic antioxidant 1,3,5-trimethyl-2,4,6-tris[3,5-di-tert.butyl-4-hydroxybenzyl]-benzene. When the reaction mixture was again at 210° C., 9.6 g of tetrabutyl titanate and 6.1 g of magnesium acetate 4 aq were added. The mixture was subsequently transferred under pressure to a 200-l autoclave. After the pressure had been decreased to 100 Pa, the temperature was increased to 245° C. After a polycondensation time varying from 2 to 6 hours the pressure in the autoclave was brought to the desired level and the polymer was extruded, cooled and then chopped into granules having a minimum size of about 3 mm. After the granules had been dried, they were charged into a 200-l rotary drier in batches of 40 kg each. After the pressure in the drier had been reduced to 400 Pa, the wall was heated to 195° C., which corresponds to a granule temperature of 188° C. The following table gives the physical properties of the copolyetheresters polycondensated to various relative viscosities after postcondensation or not in the solid phase and after the use or not of pyromellitic dianhydride as branching agent. In the table the letter A represents a copolyetherester which had a $\eta_{rel}$ of 1.89 after a polycondensation time of 2 hours and was subsequently subjected to postcondensation in the solid phase to a copolyetherester according to the invention having a $\eta_{rel}$ given in the table;

B is a copolyetherester having a $\eta_{rel}=1.94$ obtained in the melt after a polycondensation time of 3 hours: after postcondensation in the solid phase the copolyetherester obtained according to the invention had a $\eta_{rel}=2.90$;

C is a copolyetherester prepared by a prior art process and a $\eta_{rel}=2.31$ obtained in the melt after a polycondensation time of 6 hours; after postcondensation in the solid phase the copolyetherester obtained as control polymer had a $\eta_{rel}=3.09$;

D is a postesterified copolyetherester containing 4.4 eq branching agent and obtained after a polycondensation time of 3 hours;

E is a non-postesterified copolyetherester containing 4.4 eq branching agent, and having a $\eta_{rel}=2.72$ after a polycondensation time of 3.5 hours;

F is a non-postesterified copolyetherester, containing 7.0 eq branching agent, and having a $\eta_{rel}=2.73$ after a polycondensation time of 2.5 hours;

G is a copolyetherester of similar hardness and based on PBTP (36.1% by weight) and polytetramethylene oxide glycol (of a number average molecular weight of 2000).

The table below gives the properties of the polymers A and B according to the invention, and of the control polymer C, the polymers D (postcondensated), the polymer E according to U.S. Pat. No. 4,205,158, the polymer F and the commercially available copolyetherester G.

The copolyetheresters A, B, C, D, E, and F each contain 41.8% by weight of short-chain ester units.

TABLE 1

| Copolyetherester | G | A | B | C | D | E | F |
|---|---|---|---|---|---|---|---|
| $\eta_{rel}$ (1% m-cresol 25° C.) | 3,36 | 2,79 | 2,90 | 3,09 | 2,78 | 2,72 | 2,73 |
| MFI (230° C.) g/10 min | 26,1 | 17,9 | 17,7 | 18,3 | 21,5 | 26,8 | 27,3 |
| Hardness Shore D | 37 | 33,5 | 34 | 36,5 | 37,5 | 37,5 | 37,5 |
| Flexural modulus MPa | 46 | 47 | 43 | 47 | 54 | 53 | 52 |
| Tensile strength MPa⊥ | 23,1 | 11,3 | 12,3 | 17,4 | 12,0 | 12,5 | 12,2 |
|  | 22,4 | 14,4 | 17,5 | 26,2 | 15,6 | 17,3 | 14,3 |
| Elongation at rupture %⊥ | 912 | 370 | 385 | 609 | 183 | 252 | 185 |
|  | 970 | 709 | 788 | 962 | 693 | 794 | 606 |
| Tensile impact kJ/m²⊥ energy/m² (notched) | 333 | 242 | 261 | 322 | 197 | 207 | 196 |
|  | 351 | 292 | 343 | 390 | 275 | 265 | 260 |
| Tear propagation kN/m resistance, J energy, resp. | 41,3 | 22,3 | 29,8 | 39,2 | 23,0 | 23,4 | 17,3 |
|  | 2,9 | 1,4 | 1,4 | 1,5 | 0,9 | 1,0 | 0,8 |
| Tear resistance, kN/m energy, resp. J (Graves) (without incision) | 105,5 | 66,9 | 77,0 | 102,5 | 66,5 | 75,6 | 66,6 |
|  | 15,3 | 2,0 | 2,6 | 7,2 | 1,4 | 1,9 | 1,3 |
| Tear resistance, kN/m energy, resp. J (Graves) (with incision) | 57,4 | 41,4 | 42;6 | 49,2 | 41,9 | 44,1 | 40,0 |
|  | 1,9 | 1,2 | 1,4 | 1,2 | 0,9 | 0,9 | 0,7 |

The results given in the above table clearly show that the elongation at rupture, the tensile impact energy (notched) and the tearing energy of the polymers A and B are superior to the same properties of the polymers E and F in which a large amount of branching agent is contained. The properties of polymer C are also good. Because of the long polycondensation time, however, the preparation of this polymer on an industrial scale is not only costly, but use of a very long postcondensation cannot lead to giving it such an MFI as makes it suitable to be processed by blow moulding.

EXAMPLE II

In this example it is demonstrated that after postcondensation under the conditions mentioned in Example I to a $\eta_{rel}$ of 3.99, an MFI <1 and a melt strength MS of 80 the copolyetherester B thus obtained was excellently suitable to be processed by blow moulding and film blowing techniques. As for this use in the molten state the copolyetherester should have a sufficiently high melt strength (MS), the value thereof was determined. The melt strength can be expressed with the following formula:

$$MS = 100 \times (T_2/T_1)$$

wherein MS represents the melt strength, $T_1$ is the time needed for the extrudate leaving the extruder head to reach a length of 10 cm. $T_2$ represents the time needed for the extrudate to cover a distance from 30 cm to 40 cm. The melt strength was determined at a set barrel temperature of 230° C.

The copolyetherester granules were fed to a blow moulding extruder of the firm of Bekum.

Of the extruder with a screw diameter of 50 mm the barrel temperatures from the side of the hopper were; 245°-240°-235°-230° C. The temperature of the head was 220° C. and of the nozzle 210° C. The speed was 20 revolutions per minute. In this way it was possible to blow mould objects having a length of 40 cm and a very uniform wall thickness.

EXAMPLE III

Granules of the polymers A, B and C of Example I having a relative viscosity of 1.89, 1.94 and 2.31, respectively, and a minimum particle size of about 3 mm were subjected to postcondensation in the solid phase in a stream of nitrogen at a temperature of 188° C. and a pressure of 3 mm Hg until a melt index of 20 at 230° C. was obtained. The relative viscosities ($\eta_{rel}$) measured at this melt index and the postcondensation times needed to obtain them are given in the table below.

TABLE 2

| Copoly-ether-ester | poly-conden-sation | $\eta_{rel}$ after polycondensation | postconden-sation time in hours | $\eta_{rel}$ after postcondensation | minimum attain-able MFI | maximum attain-able $\eta_{rel}$ |
|---|---|---|---|---|---|---|
| A | 2 | 1,89 | 18 | 2,75 | <1 | >4,8 |
| B | 3 | 1,94 | 21 | 2,88 | <1 | >4,8 |
| C | 6 | 2,31 | 44 | 3,1 | >10 | 3,35 |

The results given in the above table clearly show that in contradistinction to what was commonly practiced in the prior art for copolyetheresters based on poly(propylene oxide)glycol, polycondensation must not be continued to obtain a relatively high relative viscosity in the melt (copolyetherester C), because the postcondensation time needed in that case is not only longer, but it also makes impossible for such a copolyetherester to be processed into a polymer having an MFI<10.

EXAMPLE IV

For the preparation of the copolyetheresters K and L of the same composition as those of Example I the same procedure was used, except that the preparation was conducted on an industrial scale, the reaction constituents being used in amounts which were 30 times as high as those used in Example I. Postcondensation in the solid phase was carried out at a temperature of 194° C. until a melt index of about 20 was obtained.

The polycondensation times, the melt indices, the relative viscosities and the postcondensation times are given in the table below.

TABLE 3

| copolyether-ester | duration of polycondensation in hours | after polycondensation $\eta_{rel}$ | after polycondensation MFI | duration of postcondensation in hours | after postcondensation $\eta_{rel}$ | after postcondensation MFI |
|---|---|---|---|---|---|---|
| K | 4 | 2,28 | 125 | 13 | 2,80 | 19,2 |
| L | 6 | 2,46 | 75 | 18 | 2,95 | 20,7 |

The results in this table clearly show the great advantage of the use of a short polycondensation time.

EXAMPLE V

Four copolyetheresters M, N, O and P were prepared in the same way and of the same composition as indicated in Example I, with the proviso that in the preparation of the polymers N, O and P also use was made of a branching agent in the form of trimellitic anhydride in amounts of respectively 0.4, 1.1 and 3.8 equivalents per 100 moles of discarboxylic acid. For each copolyetherester the polycondensation time was 3 hours and the postcondensation times in the solid phase at a granule temperature of 188° C. were 23, 16 and 6.5 hours for the polymers M, O and P, respectively. The postcondensation time for polymer N in the solid phase was 42 hours at a granule temperature of 180° C.

The properties of the polymers M, N and O according to the invention and of the polymer P containing a large amount of branching agent according to U.S. Pat. No. 4,205,158 are given in the following Table 4.

TABLE 4

| Copolyetherester | M | N | O | P |
|---|---|---|---|---|
| $\eta_{rel}$ (1% m-cresol 25° C.) | 2,83 | 2,71 | 2,80 | 2,84 |
| MFI (230° C.) g/10 min | 19,9 | 24,8 | 16,4 | 8,4 |
| Hardness Shore D | 33 | 34 | 34,5 | 38,5 |
| Flexural modulus MPa | 42 | 44 | 47 | 56 |
| Tensile strength MPa $\perp$ | 12,9 | 13,5 | 12,8 | 13,7 |
|  | 17,2 | 15,6 | 17,0 | 16,1 |
| Elongation at $\perp$ rupture % | 452 | 496 | 341 | 153 |
|  | 783 | 727 | 778 | 550 |
| Tear resistance, energy, resp. kN/m (Graves) J (with incision) | 80,7 | 75,8 | 74,8 | 72,5 |
|  | 3,6 | 2,9 | 2,3 | 1,5 |
| Tear resistance, energy, resp. kN/m (Graves) J (with incision) | 40,6 | 41,3 | 42,7 | 43,6 |
|  | 1,0 | 1,2 | 1,0 | 0,8 |

The results given in the above table clearly show that the hardness and the flexural modulus of polymer P differ significantly from the respective values of the polymers according to the invention.

It also appears that the elongation at rupture of polymer P is significantly lower than that of the polymers according to the invention.

We claim:

1. A copolyetherester substantially consisting of repeating intralinear long-chain ester units and short-chain ester units which are randomly joined head-to-tail through ester linkages, which long-chain ester units correspond to the formula $$-\text{OGO}-\overset{\overset{\text{O}}{\|}}{\text{C}}\text{R}\overset{\overset{\text{O}}{\|}}{\text{C}}-$$

and which short-chain ester units correspond to the formula $$-\text{ODO}-\overset{\overset{\text{O}}{\|}}{\text{C}}\text{R}\overset{\overset{\text{O}}{\|}}{\text{C}}-$$

wherein G represents a divalent radical which remains after removal of terminal hydroxyl groups from a poly(propylene oxide) glycol of which the terminal groups are capped with 15 to 35% by weight of ethylene oxide and which has a molecular weight of 1500 to 2800, and R represents a divalent radical which remains after removal of carboxyl groups from at least one carboxylic acid having a molecular weight of less than 300, and D represents a divalent radical which remains after removal of hydroxyl groups from at least one aliphatic diol having a molecular weight of less than 250, with the proviso that the short-chain ester units comprise at least 75 mole per cent of 1,4-butylene terephthalate units, the short-chain ester units form 25 to 55% by weight of the copolyetherester and the melt index MFI (determined at 230° C. in conformity with ASTM D-1238) is not higher than 50, characterized in that copolyetherester contains less than 1.5 equivalents of branching agent per 100 moles of dicarboxylic acid and the relative viscosity $\eta_{rel}$ (1 g polymer in 100 g m-cresol at 25° C.) of the copolyetherester is in the range of 2.45 to 5.0 and the melt index MFI is between $$0.2 + 157 \times e^{-(\frac{\eta_{rel}-0.14}{0.8469})^2}$$

and

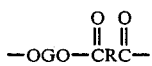

$$3.2 + 157 \times e^{-(\frac{\eta_{rel}-1.74}{0.8469})^2}$$

2. A copolyetherester according to claim 1, characterized in that the short-chain ester units constitute 35 to 50% by weight of the copolyetherester.

3. A copolyetherester according to claim 1, characterized in that at a relative viscosity of >2.6 it has a melt index not higher than 30 g/10 min.

4. A copolyetherester according to claim 1, characterized in that at a relative viscosity of >2.75 it has a melt index not higher than 20 g/10 min.

5. A copolyetherester according to claim 1, characterized in that the short-chain ester units are 1,4-butylene terephthalate units.

6. A process for the preparation of a copolyetherester according to claim 1, which comprises forming a copolyetherester having a relative viscosity of 1.8 to 2.5 by melt condensation, and subjecting the copolyetherester so formed to postcondensation in a stream of an inert gas or in vacuo at a temperature of 170° to 220° C. to obtain a polyetherester having a relative viscosity in the range of 2.45 to 5.0 and a melt index MFI (determined at 230° C. in conformity with ASTM D 1238) between $$0.2 + 157 \times e^{-(\frac{\eta_{rel}-0.14}{0.8469})^2}$$

and

$$3.2 + 157 \times e^{-(\frac{\eta_{rel}-1.74}{0.8469})^2}$$

7. A process according to claim 6, characterized in that a copolyetherester is prepared having a relative viscosity in the range of 1.85 to 2.35 and the copolyetherester is subsequently subjected to postcondensation in the solid phase to obtain a melt index not higher than 30 g/10 min and a relative viscosity of at least 2.6.

8. A process according to claim 6, characterized in that a copolyetherester is prepared having a relative viscosity in the range of 1.9 to 2.3 and the copolyetherester is subsequently subjected to postcondensation in the solid phase to obtain a melt index not higher than 20 g/10 min and a relative viscosity of at least 2.75.

* * * * *